United States Patent [19]
Kawasaki et al.

[11] Patent Number: 5,866,275
[45] Date of Patent: Feb. 2, 1999

[54] LAYERED SINTERED BODY FOR ELECTROCHEMICAL CELLS

[75] Inventors: Shinji Kawasaki, Nagoya; Shigenori Ito; Kiyoshi Okumura, both of Kasugai, all of Japan

[73] Assignee: NGK Insulators, Ltd., Japan

[21] Appl. No.: 783,004

[22] Filed: Jan. 14, 1997

[30] Foreign Application Priority Data

Jan. 18, 1996 [JP] Japan ............................. 8-6718
Dec. 26, 1996 [JP] Japan ........................... 8-348130

[51] Int. Cl.⁶ ....................................... H01M 8/04
[52] U.S. Cl. ................................. 429/30; 429/39
[58] Field of Search .................... 429/34, 38, 39, 429/30, 32

[56] References Cited

U.S. PATENT DOCUMENTS 4,324,844  4/1982  Kothmann ........................ 429/34 X
4,339,322  7/1982  Balko et al. ...................... 429/38 X
5,527,363  6/1996  Wilkinson et al. ................ 429/34 X

FOREIGN PATENT DOCUMENTS

A-5-54897  3/1993  Japan .
A-5-89890  4/1993  Japan .
A-6-68885  3/1994  Japan .

*Primary Examiner*—Anthony Skapars
*Attorney, Agent, or Firm*—Parkhurst & Wendel

[57] ABSTRACT

A layered sintered body for an electrochemical cell which is a planar-type layered sintered body composed of an electrode and a separator stacked thereon, wherein a plurality of gas flow passages are formed by coupling grooves formed on the electrode and the separator. Even when this electrochemical cell is subjected to repetition of a cooling-heating cycle, an increase of internal resistance on and around the boundary between the separator and electrode can be restrained and layer separation and development of cracks at the joint boundary can be prevented.

5 Claims, 7 Drawing Sheets

FIG_1a
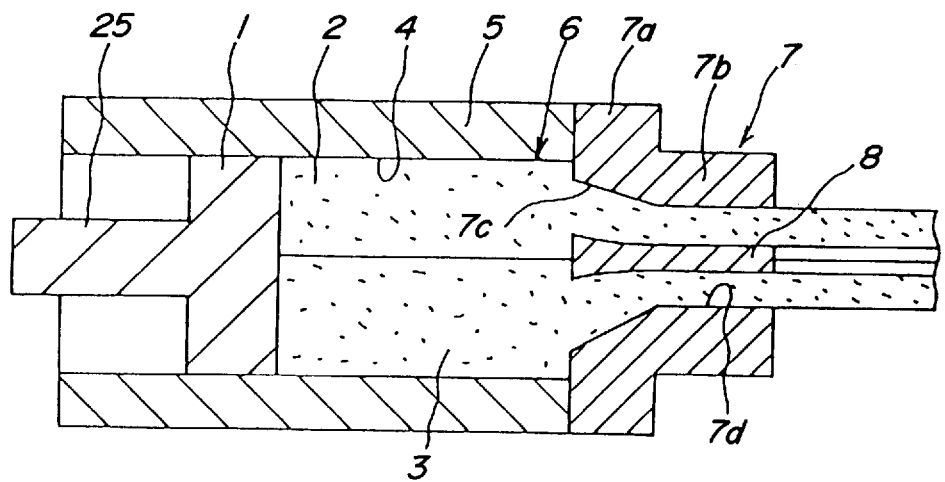
FIG_1b
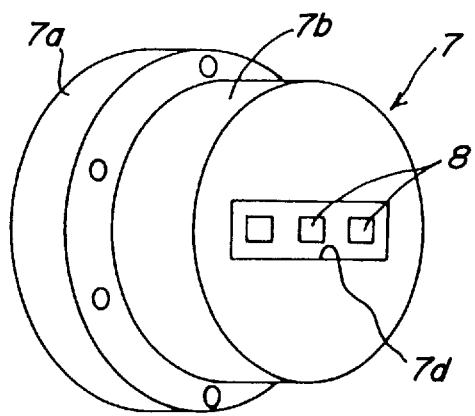

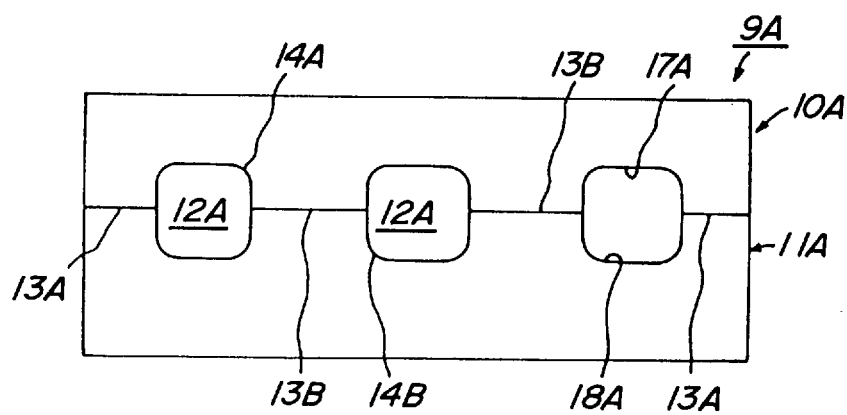
FIG_2a
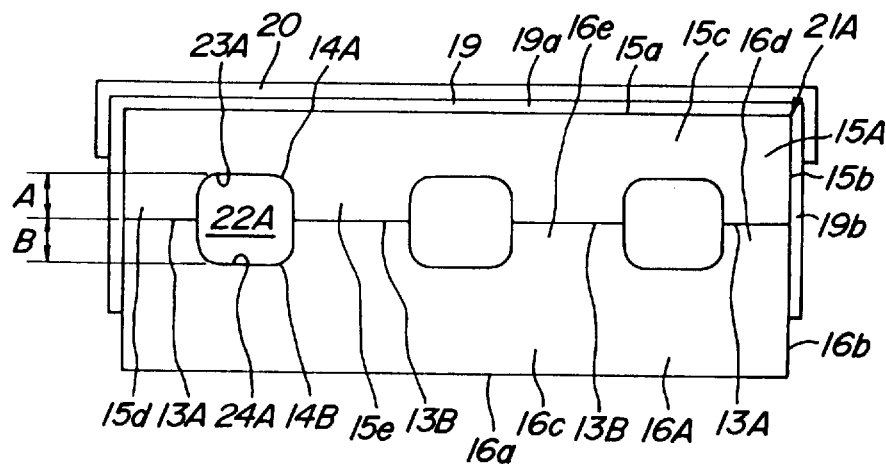
FIG_2b

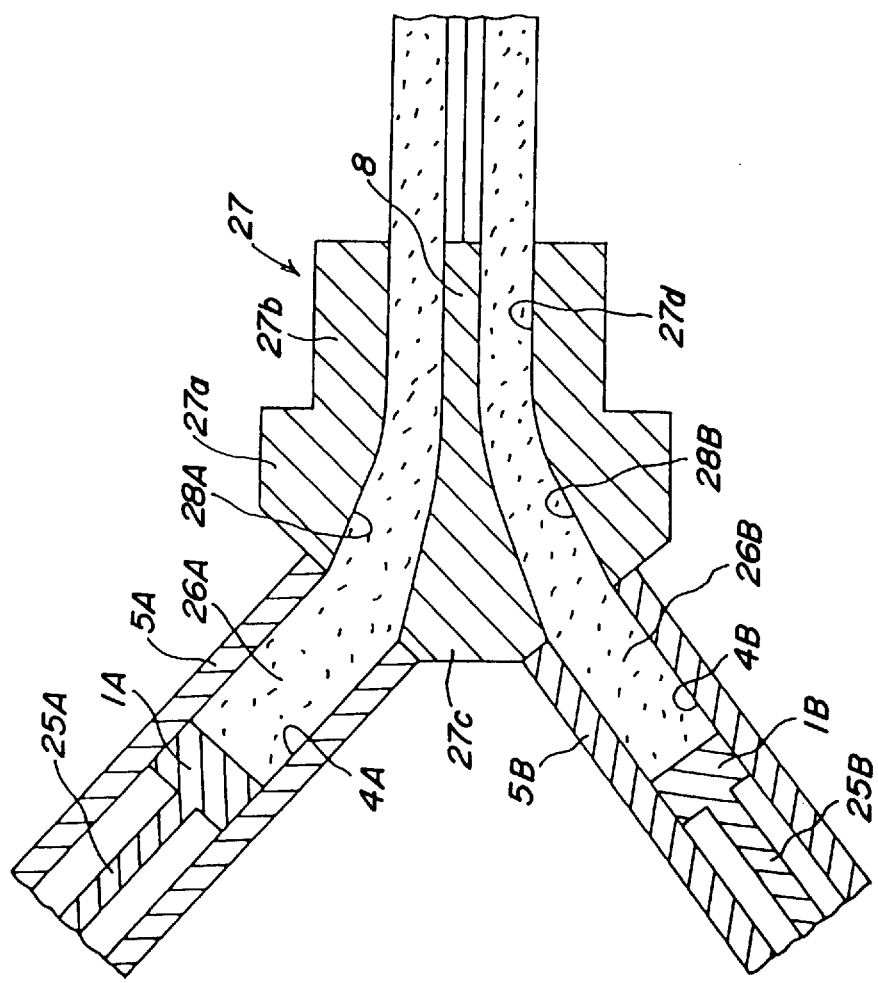

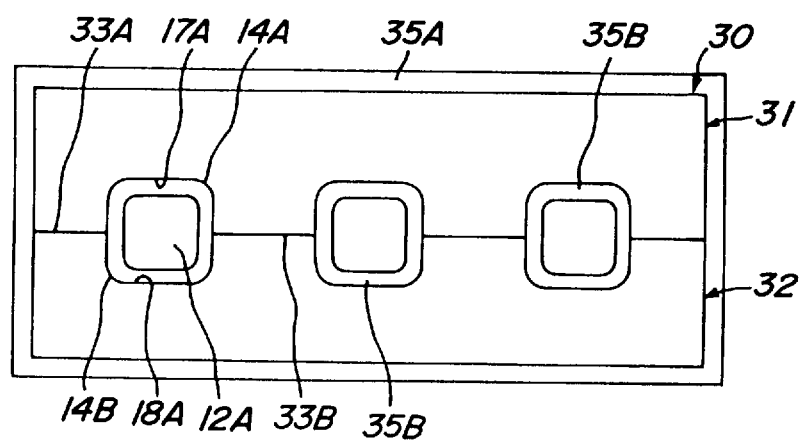
FIG_6a
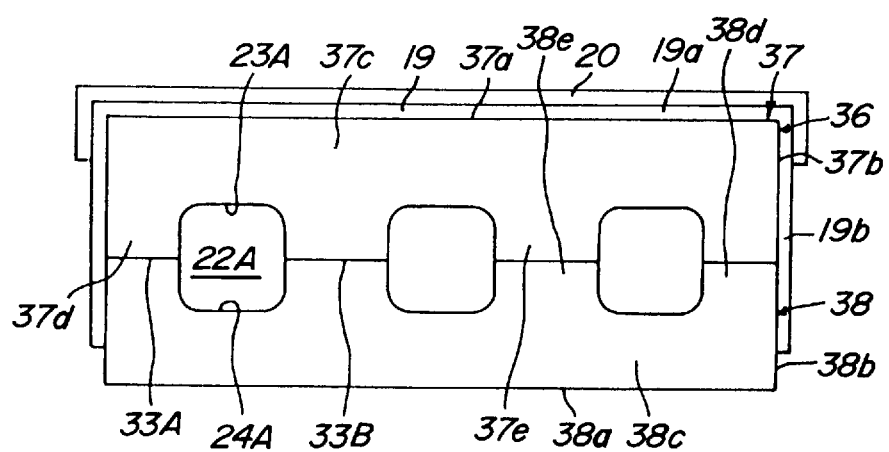
FIG_6b

FIG_7a
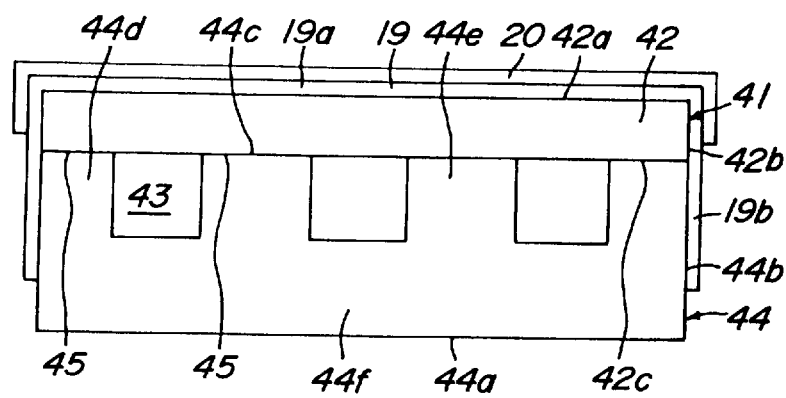
FIG_7b
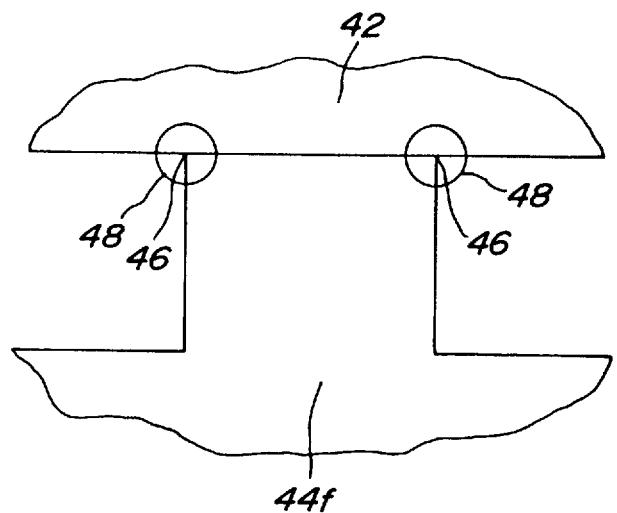

LAYERED SINTERED BODY FOR ELECTROCHEMICAL CELLS

BACKGROUND OF THE INVENTION

1. Field of the Invention

The present invention relates to the improvement of electrochemical cells, such as solid electrolyte fuel cells, water vapor electrolytic cells, oxygen pumps, NOx decomposition cells or the like.

2. Description of the Prior Art

The solid electrolyte fuel cells, i.e. solid oxide fuel cells (SOFC), are roughly classified into two categories: a so-called planar type, and a tubular type. In the SOFC of planar type, a stack for power generation is constructed by stacking alternately the so-called separators and generator layers. In Japanese Patent Application Kokai No. 05-054,897, generator layers comprising a fuel electrode (anode) and an air electrode (cathode), respectively, are fabricated, interconnectors are also fabricated, and then, a multilayered body is fabricated by stacking alternately the generator layers and interconnectors with interposition therebetween of a membrane comprising ceramic powder and an organic binder. The layered body is then heat-treated to bond the generator layers with the interconnectors.

Alternatively, in Japanese Patent Application Kokai No. 06-068,885, is described that a green shaped body for an interconnector is stacked on a green shaped body for a distributor on the air-electrode side, and this stacked body is monolithically sintered to bond the interconnector with the distributor. In this method, between both the green shaped bodies is applied a material having a thermal shrinkage behavior extremely different from those of the green shaped bodies, whereby a stress relaxation layer is formed to mitigate stress between the green shaped bodies. This stress relaxation layer disintegrates into fine pieces during shrinking upon firing, whereby the stress is mitigated.

The present inventors have studied the manufacture of electrochemical cells of such a planar type SOFC. A typical shape of the such type electric cells is shown in FIG. 7a that is a schematic cross-sectional view. In FIG. 7a, a support of this electrochemical cell is the conjoint body 41. This conjoint body 41 is a conjugated body of an air electrode (cathode) 42 with a separator 44. The air electrode 42 has a planar shape. In the separator 44, a plurality of narrow, long banks 44d and 44e are formed on a plate member 44f and grooves are formed between the banks 44d and 44e. With each top face 44c of the banks 44d and 44e, the principal face 42c of the air electrode 42 is bonded. Additionally, 44a is the bottom face of the separator.

The side face 42b of the air electrode 42 is contiguous to the side face 44b of the separator 44 without difference in level. An oxidant gas flow passage 43 has a rectangular or square cross-sectional shape. The end portions of the oxidant gas flow passage 43 are open to the end faces of the separator 44. Additionally, 45 is a joint boundary face. A dense solid electrolyte membrane 19 is formed on the conjoint body 41. In this instance, the main portion 19a of the solid electrolyte membrane 19 is formed on the top face 42a of the air electrode 42. Both sides of the main portion 19a are extended to form extended portions 19b which cover the side faces 42b of the air electrode 42 and further the upper portions of the side faces of the separator 44. Consequently, the oxidant gas flow passages 43 are kept airtight excepting the openings thereof. A fuel electrode (anode) membrane 20 is formed on the solid electrolyte membrane 19.

However, it has been found that the following problems are posed in the electrochemical cells of SOFC utilizing such a conjoint body. Namely, when these electrochemical cells are subjected to repetition of a heating-cooling cycle between a high temperature exceeding 1,000° C. during electric generation and room temperature, there may happen the case where the internal resistance of the whole conjoint body of the electrode 42 with the separator 44 is increased, and when things are at the worst, the electrode may be separated from the separator. Particularly, with a heating-cooling cycle test as the above conducted under conditions considerably severer than actual use conditions, it has been found that, in some conjoint bodies, fine cracks are developed from near the joint boundary between the electrode and separator.

Alternatively, the same problem as the above has been found also in electrochemical cells other than the SOFC. For example, in the case of high temperature water vapor electrolytic cells, the cells are subjected to the heating-cooling cycle between room temperature and 1,000° C., with starting and stopping of the high temperature water vapor electrolytic cells. Therefore, cells having characteristics which would not be deteriorated even under suck severe conditions have been expected.

The task of the present invention is, even when electrochemical cells such as SOFCs or the like are subjected to the repetition of a heating-cooling cycle, for example, from operation at high temperatures exceeding 1,000° C. to temperature fall to room temperature, to prevent the layer separation and crack formation on and around the point boundary between the separator and electrode so that the increase of the internal electric resistance can be restricted. A further task is to obviate a possibility of developing cracks in the surroundings of the joint boundary of the electrode and separator.

SUMMARY OF THE INVENTION

The layered sintered body according to the present invention comprises an electrode and a separator of an electrochemical cell, wherein a plurality of gas flow passages are provided, which is characterized in that a plurality of grooves are provided on the electrode on a side thereof adjoining to the separator, a plurality of grooves are provided on the separator on a side thereof adjoining to the electrode, and each of the gas flow passages is formed by coupling one of said grooves formed or the electrode with the one opposite thereto of the grooves formed on the separator.

Further, the electrochemical cell according to the present invention comprises the above-described layered sintered body, a solid electrolyte membrane provided on an electrode, and another electrode membrane provided on the solid electrolyte membrane, which is characterized in that gas in each gas flow passage is hermetically sealed off from external gases by the separator and solid electrolyte membrane.

When the aforementioned layered sintered bodies or electrochemical cells are manufactured, pug for constituting a green shaped body for an electrode and pug for constituting a green shaped body for a separator are continuously and simultaneously fed into a unitary extrusion die, and extruded from the extrusion die in the form of a layered body consisting of a green shaped body for an electrode and a green shaped body for a separator conjugated with each other, which layered body is then monolithically sintered.

Further when the abovementioned layered sintered bodies or electrochemical cells are manufactured, a shaped body for an electrode is stacked on a shaped body for a separator to provide a layered body, with interposition of a bond material layer between the electrode and separator, in such a fashion that through-holes each corresponding to gas flow passages are formed inside the layered body, and then the layered body is monolithically sintered under pressure.

As regards the conjoint bodies which are supports of the aforementioned planar-type electric cells, the present inventors investigated the reasons for the deterioration of boundary conditions between the electrodes and separators due to the above-described heating-cooling cycle during the generation which causes deterioration of electric characteristics such as internal resistances or the like, and the separation of layers, or the development of cracks under severe conditions. As the result, the following conclusion has been reached. Namely, in FIG. 7b, is shown a partial view in an enlarged scale of a joint boundary surface between the electrode 42 and the separator 44. It is assumable that the phenomena of the increase of the internal resistance, or the layer separation as well as the development of the cracks are prone to appear in the vicinity of the joint boundary surface. However, it has been found that those are liable to develop on the joint boundary surface between the electrode 42 and the separator 44, particularly in the vicinity of the edge 46 of the bank 44e.

Its wherefore is probably that there may be problems such that fine layer separations are prone to be initiated on the joint boundary surface between the electrode and the separator due to a difference in thermal expansion coefficient or the like, as well as discontinuity of ceramic textures, between both materials, and in addition, that electric currents are prone to concentrate on the vicinity of the edge 46, generating local heat and building up stress to form an initiating point of layer separation or cracks.

The present inventors, based on the above new findings, have conceived of forming a plurality of grooves on the electrode on the side thereof adjoining to the separator, also forming a plurality of grooves on the separator on the side thereof adjoining to the electrode, and then forming through-holes for gas flow passages, each by coupling the grooves on the electrode and separator. As the result, the corners of each gas flow passage are positioned within the groove on the electrode or separator, and the joint boundary surface between the electrode and separator is formed on a position different from the position of every bottom corner of each bank. Namely, discontinuous portions in ceramic texture as the above would not come to the position on or near around the bottom corners of each bank. Consequently, since electric currents hardly concentrate on and around the joint boundary surfaces, it has become possible to prevent deterioration of electric characteristics such as the increase of the internal electric resistance in the vicinity of the joint boundary surface, or the development of layer separation or formation of cracks.

Further, both the electrode and interconnector have grooves for forming gas flow passages, and the layered sintered bodies have nearly a symmetrical cross-sectional shape. Accordingly, the layered sintered bodies and electrochemical cells using the layered sintered bodies have a larger strength as compared with asymmetric ones.

Furthermore, in either case where layered bodies are obtained either by a shaping process of two layer conjugate-extrusion, or by conjugating and pressurizing two separately extruded shaped bodies, the above shape has advantages. Namely, one of the advantages is that during the two layer conjugate-extrusion from an extrusion die, a shape as close to symmetric as possible is hardly bent immediately after the extrusion. Alternatively, the layered bodies are obtained by conjoining an electrode with an interconnector is separately shaped by extrusion and then pressurizing the conjoined bodies, the types having grooves are also hardly bent during the extrusion. This is because that while electrodes without grooves are necessarily shaped thin, those having grooves can be shaped thicker, in addition, a beam support structure formed by the grooves plays a role of increasing strength, and so are more advantageous in respect of strength.

The electrochemical cells according to the present invention can be used as an oxygen pump, as well as a high temperature water vapor electrolytic cell. These cells can be used as an apparatus for producing hydrogen and further used as an apparatus for removing water vapor. In this case, the following reactions are carried out on each electrode:

anode: $H_2O+2e^- \rightarrow H_2+O^{2-}$ 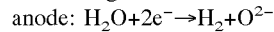
cathode: $O^{2-} \rightarrow 2e^- + \frac{1}{2}O_2$ 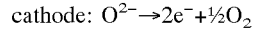

The electrochemical cells according to the present invention further can be used as a NOx decomposition cell. This decomposition cell can be used as an apparatus for purifying exhaust gases discharged from motor-vehicles and electric power generators. At present, NOx exhausted from gasoline-engines are being treated with ternary-functioning catalysts. However, with increasing low fuel consumption type engines, such as lean burn engines, diesel engines or the like, the oxygen content in exhaust gases of these engines increases so much that the ternary catalysts will become inactivated.

Then, if the electrochemical cells of the present invention are used as a NOx decomposition cell, it removes oxygen in the exhaust gases passing through the solid electrolyte membrane, concurrently with decomposition by electrolysis of NOx to $N_2$ and $O^{2-}$, and also can remove the oxygen produced by this electrolysis. Besides, with the above process, water vapor in the exhaust gases is electrolyzed to produce hydrogen and oxygen, and the hydrogen reduces the NOx to $N_2$.

In the case of NOx decomposition cells, it is particularly preferred to use a ceria based ceramic as the solid electrolyte membrane. As an anode material, paradium and paradium-ceria cermets are preferred.

In the present invention, the cross-sectional shape of the gas flow passages may be polygonal. However, in this instance, it is preferred to round each corner of the polygonal gas passages to a generous radius. Thereby, electric currents are readily dispersed over the curved portions during power generation or the like, and the electric currents are more hardly concentrated on the corner edges of the banks. In this embodiment, the cross-sectional shape of the gas flow passages is not specifically limited. However, it is preferred that the grooves of the electrode and the grooves of the separator have the same type polygonal cross-sections, whereby deterioration due to the power generation cycle may be further decreased. By the term "same type polygonal cross-sections" herein used, is meant polygonal cross-sections having the same number of corners. It is not necessary for the grooves to have the same depth.

The cross-sectional shape of the gas flow passages is preferred to be defined by a closed, rounded outline, which can substantially obviate current concentration as described above. Such an outline is not specifically limited. However, a circle or ellipse is preferred. Further preferred is that both the grooves on the electrode and the grooves on the separator are semi-circular or semi-elliptical, respectively.

The grooves provided on the electrode or separator are preferred to have a depth of at least 0.5 mm, whereby the aforementioned function and performance of the present invention will become particularly conspicuous. In this sense, in order not to form cracks or the like even under extraordinarily severe conditions, it is further preferred that each groove has a depth of not less than 1.0 mm.

Besides, the grooves provided on the electrode or separator are preferred to have a depth of at most 10 mm, whereby the power generation capacity per unit volume of the electrochemical cells can be increased. From this point of view, it is further preferred that each groove has a depth of not more than 6 mm.

The electrochemical cells according to the present invention are preferred to be formed into a long extending shape. The ceramic sintered bodies to be used therefor are also preferred to be formed into a long rectangular shape. Concretely, as Japanese Patent Application Kokai No. 05-89,890 discloses, the rectangular shape is preferred to have its long side and short side in the ratio in length at least 2:1, more preferably at least 5:1.

For manufacturing the layered sintered bodies according to the present invention, the following manufacturing process can be adopted.

In the manufacture of the aforementioned conjoint bodies, the present inventors have conceived of continuously feeding pug for constituting a porous green shaped body and pug for constituting a dense green shaped body simultaneously into a unitary extrusion die; extruding the porous green shaped body and the dense green shaped body in a mutually conjugated state from the die; and then firing monolithically the resulting conjugated body.

According to such a manufacturing process, layered bodies having different cross-sectional shapes can be manufactured by varying the shape of the die. Besides, it has been made possible to manufacture particularly a long extending product (e.g., at least 1,000 mm long) by utilizing the extrusion process. Further, according to this process, in the course of extrusion shaping, the green shaped body for electrodes and separators form firm contact with each other at conjoint boundary. Moreover, since a pressurizing step as in the conventional process is not required, the number of steps in the process can be extremely reduced. Furthermore, it has been found that the final layered sintered bodies can be provided with a contact strength and an electroconductive property which are at least comparable to those in the case of utilizing a press shaping as mentioned before.

In this embodiment, it is preferred to use an extrusion die of which inlet has a cross-sectional area smaller than that of the outlet. With this die, each green shaped body can be more firmly joined to the other at the outlet of the die. In addition, the outlet passage and the inlet passage, of the die, are preferred in the ratio in length 1: at least 2, more preferably 1: 3~5.

Extrusion dies having an inlet of circular shape are easily machined in the manufacture thereof. In addition, the shape of the inlet of the dies is adequately changed so as to allow the pug to enter easily. As an extrusion mechanism for extruding each pug from the die, use may be made of a plunger, vacuum pug mill and the like.

If an aqueous binder is used for the pug, since it is not necessary to conduct an exhaust gas treatment as in the case where an organic solvent is used, the equipment can be simplified, and moreover the layer conjugated body just extruded from the die is hardly bent. In this case, it is further preferred to make the water content 10~20% by weight. Examples of the aqueous binder include polyvinyl alcohols, methyl celluloses, ethyl celluloses and the like.

Further in extruding the abovementioned layered body, it has been found that there is posed a problem such that the layered body is prone to bending. Namely, there is a tendency such that the pug relatively hard has a low flow rate and the other pug relatively soft has a high flow rate, during extrusion. This difference in the flow rate results in deformation of the layered body by bending or warping from the outlet of the die towards the advancing tip of the extruded body. Furthermore, due to the difference between the flow rates of the pug, there has arisen a phenomenon such that the green shaped bodies are conjugated discordantly with each other at their joint boundary surface.

In order to extrude the layered body straight, preventing the bending thereof, so that the green shaped bodies may be conjugated in agreement with each other at their joint boundary surface, both the pug for electrodes and the pug for separators are preferred to have a hardness of 10~14, respectively, and the difference between the hardness of the pug is preferred to be at most 2. The hardness herein used is determined according to the standard of the NGK clay-hardness tester.

However, many difficulties may be encountered in conducting such minute adjustment of the pug in practical manufacturing apparatuses. Therefore, when the pug for constituting green shaped bodies for electrodes and the other pug for constituting green shaped bodies for separators are continuously fed into a unitary extrusion die, the pug for constituting green shaped bodies for electrodes can be extruded from a first extrusion mechanism into the die, and the other pug for constituting green shaped bodies for separators can be extruded from a second extrusion mechanism into the die. Thus, it has been made possible to prevent the bending or the like of the layered body by mechanically adjusting each extrusion rate or each extrusion pressure of the first and second extrusion mechanisms.

Concretely, for example, when the pug for separators is being extruded from the die at a high flow rate, the extrusion rate of the second extrusion mechanism for extruding the pug for separators is decreased to lower the back pressure, and thus the flow rate of the pug for separators can be decreased.

The aforementioned layered body is press-shaped to produce a conjoint layered body, and the resulting conjoint layered body can be monolithically sintered. In this embodiment, it is preferred to apply or print a bond material on the surfaces between the green shaped bodies.

In this instance, when the bond material for bonding the separator with the cathode contains at least one of the materials of the separator and electrode, their bonding maybe further facilitated. Particularly, when the material of the cathode is a perovskite-type oxide composite containing lanthanum and the bond material contains lanthanum chromite, the chromium component in the lanthanum chromite diffuses into the cathode, resulting in a loss of chromium in the composition of lanthanum chromite component in the bond material. Consequently, the bond material becomes readily sintered, and the bonding strength will be improved. However, in this instance, in order to proceed the diffusion of chromium, it is necessary to sinter at a temperature of at least 1450° C.

The abovementioned bond material is preferred to be paste prepared by admixing main starting materials with an organic binder and water. An organic solvent may be used in lieu of water. Examples of the organic binders include polymethyl acrylates, nitrocelluloses, polyvinyl alcohols, methylcelluloses, ethylcelluloses, waxes, acrylate polymers, methacrylate polymers and the like.

In the embodiment for press-shaping the layered bodies, it is preferred to dry the layered bodies, prior to the press-shaping. By conducting the drying step, the bond material is densified approximately to the same extent as both the press-shaped bodies, when the layered bodies are press-shaped. Therefore, the shrinkage of the bond material becomes substantially the same as the shrinkages of both the press-shaped bodies during firing, to that the conditions of the joint boundary surface after firing are extremely improved. However, in this drying step, the green shaped bodies for electrodes are prone to warping which is liable to cause separation between green shaped bodies. The warping of the green shaped bodies for electrodes, however, can be restrained by the drying step, particularly drying while pressing, of the layered bodies.

In this drying step, it is particularly preferred to press the layered body with an annular elastic member fixed around the circumferential surface thereof. It is because substantially an isostatic pressure can be applied on the layered body centripetally from its entire circumference by the annular elastic member, even when green shaped bodies have difference in dimension, ruggedness or the like in their circumferencial shape. Thus, the elastic member can prevent the layered bodies having a low strength as yet from deformation or fracture due to a forced pressure.

The pressure for press-shaping layered bodies is preferred to be at least 100 $kgf/cm^2$, more preferably at least 500 $kgf/cm^2$, with the view of increasing adhesiveness between green shaped bodies of the layered bodies. The upper limit of the pressure may be practically at most 10 $tf/cm^2$. As the press-shaping process, it is preferred to employ a uniaxial pressing or cold isostatic pressing process.

However, in the case where all the green shaped bodies constituting the layered body are plates, it is possible to apply a high pressure loading by means of a uniaxial pressing process. However, since the layered bodies which are the object of the present invention are provided with through-holes which are to become gas flow passages after monolithic sintering, a high pressure such as mentioned above will crush the layered bodies towards the through-holes.

The present inventors, aiming at solution of this problem, immersed a layered body in a liquid latex, thereby to make the liquid latex adhere not only to exteriors but also to interior surfaces exposed to the gas flow passages of the layered body, then after drying, covered the entire surfaces including the through-holes with an elastic material, and tried to press-shape this layered body by means of a cold isostatic pressing process (CIP process). As the result, even a pressure as high as 500 $kgf/cm^2$ could not crush the layered body, and moreover, adhesiveness between the electrode and separator could sufficiently be increased, with the consequence that in the co-sintered body, the electrode and separator were successfully conjoined without forming a seam or gap at the boundary therebetween.

The separator is preferred to have a relative density of at least 94% in order to maintain air-tightness. The maximum relative density of the separator is 100%. Alternatively, the electrode is preferred to have a relative density of at least 60% from the viewpoint of strength, and in order to improve the flowability of gases for power generation, it is preferred to be at most 85%, and more preferably at most 75%.

In the present invention, electrodes to be is integrally conjugated with a separator include both the cathode (air electrode) and anode (fuel electrode) and, however, the cathode is more preferred. Moreover, conjugation of self-support type cathodes with separators is particularly preferred. Because, when a layered body comprising green shaped bodies of a cathode and separator is shaped, the combination of the self-support type cathode and separator provides a thicker and stronger layered body which is easier to handle.

The main starting material for the separators is preferred to be a perovskite type oxide composite containing lanthanum, more preferably, lanthanum chromite, because they have heat resistance, oxidation resistance and reduction resistance. Further, the pug for constituting green shaped bodies for separators can be produced by admixing the above main starting materials with an organic binder and water. Examples of the organic binder include polymethyl acrylates, nitrocelluloses, polyvinyl alcohols, methyl celluloses, ethyl celluloses, starch, waxes, acrylate polymers, methacrylate polymers or the like. When the quantity of the main starting materials is 100 parts by weight, it is preferred to admix the organic binder in an amount of 0.5~5 parts by weight.

The main starting material for cathodes is preferred to be a perovskite type oxide composite containing lanthanum, more preferably lanthanum marganite or lanthanum cobaltite, and most preferably lanthanum manganite. The lanthanum chromite and lanthanum manganite maybe doped with strontium, calcium, chromium (in the case of lanthanum manganite), cobalt, iron, nickel, aluminum, or the like. The main starting material for anodes is preferred to be nickel, paradium, platinum, nickel-zirconia mixed powder, platinum-zirconia mixed powder, paradium-zirconia mixed powder, nickel-ceria mixed powder, platinum-ceria mixed powder, paradium-ceria mixed powder, or the like, The pug for constituting shaped bodies for electrodes can be produced by admixing the main starting material for electrodes with an organic binder, foaming agent and water. Examples of the organic binder include the ones for the separators. Further, when the quantity of the main starting materials is 100 parts by weight, it is preferred to admix the organic binder in an amount of 0.5~5 parts by weight.

The dewaxing or caramelizing step can be conducted separately from the firing step. However, it is preferred to dewax press-shaped bodies or layered bodies in the course of temperature increase during firing. For the press-shaped bodies or layered bodies for solid electrolyte type fuel cells, the firing temperature is generally 1,300° C.~1,700° C.

As a material for solid electrolyte membrane, yttria-stabilized zirconia or yttria-partially-stabilized zirconia is preferred. However, other materials also can be used. Alternatively, in the case of NOx decomposing cells, cerium oxide is also preferred.

Further, the process for manufacturing the layered sintered bodies according to the present invention is not specifically limited. For example, an electrode and a separator are produced severally, and then these can be conjoined with each other.

BRIEF DESCRIPTION OF THE DRAWING

The above and other objects, features and advantages of the present invention will become more apparent from reading the following description of the preferred embodiments taken in connection with the accompanying drawings, wherein:

FIG. 1a is a longitudinal sectional view schematically showing a state of extrusion-shaping a layered body according to the present invention, wherein pug 2 for an electrode and pug 3 for a separator are being fed simultaneously into a unitary extrusion die 7;

FIG. 1b is a slant view showing an extrusion die 7 which is suited for application in the manufacture of the layered sintered body according to the present invention;

FIG. 2a is a front view showing a layered body 9A according to the present invention;

FIG. 2b is a front view showing an electro-chemical cell fabricated by forming a solid electrolyte membrane 19 and an anode membrane 20 on a layered sintered body 21A;

FIG. 4 is a longitudinal sectional view schematically showing a state of extrusion-shaping a layered body according to the present invention, wherein pug 26A for an electrode and pug 26B for a separator are being fed simultaneously into a unitary extrusion die 27;

FIG. 6a is a front view showing the layered body 30 covered with membranes 35A and 35B;

FIG. 6b is a front view showing a cell fabricated with a layered sintered body obtained by monolithically sintering the layered body 30;

FIG. 7a is a front view showing a conventional electrochemical cell; and

FIG. 7b is an enlarged front view showing partly the surroundings of a joint boundary of the conventional electrochemical cell shown in FIG. 7a.

In FIGS. 1a and 1b, the extrusion die 7 comprises an inlet block 7a and an outlet block 7b. The approach 7c in the inlet block 7a has a circular cross-sectional shape and the outlet channel 7d formed in the outlet block 7b has an approximately rectangular cross-sectional shape. The outlet channel 7d is provided therein with a predetermined number of cavity-forming members 8. This extrusion die 7 is fixed on a cylinder 5 having a circular cross-sectional shape. The inside space 4 of the cylinder 5 is charged with pug 2 for a cathode and pug 3 for a separator. The pug 2 and pug 3 having a semicircular cross-sectional shape, respectively, constitute unitedly a columnar shaped body.

Figure 3A:
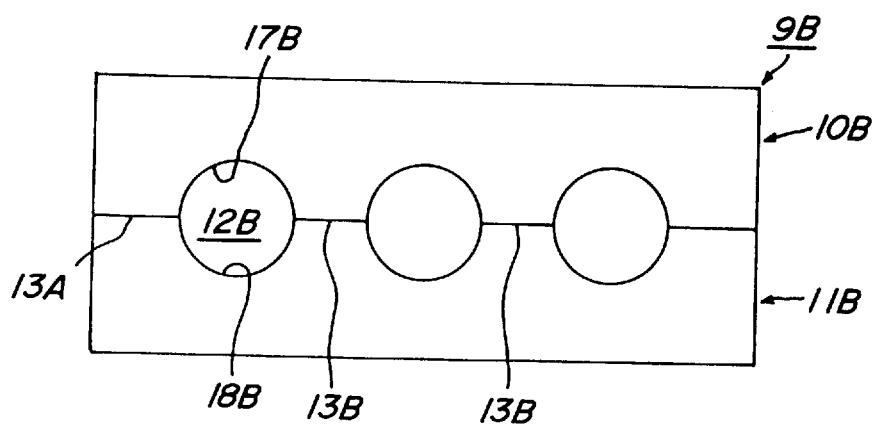
FIG. 3a is a front view showing a layered body 9B.

The rod 25 of the plunger 1 is thrusted towards the die 7 to extrude the pug 2 and pug 3 through the die. Each cavity-forming member 8 is positioned in the boundary region of the pug 2 and pug 3. By regulating the quantity and the like of each pug, a layered body 9A having a shape shown in FIG. 2a can be obtained.

In this layered body 9A, the green shaped body 10A for the cathode and the green shaped body 11A for the separator are firmly contacted with each other. The green shaped body 10A, for example, is rectangular in its plan view and has grooves 17A extending along the longitudinal axis thereof. Alternatively, the green shaped body 11A has substantially the same rectangular shape as the green shaped body 10A, and has grooves 18A extending along the longitudinal axis thereof. Two bottom corners of the groove 17A are rounded to a generous radius 14A, and two bottom corners of the groove 18A also are rounded to a generous radius 14B, respectively.

A layered sintered body 21A as shown in FIG. 2b can be manufactured by firing this layered body 9A. In the cathode 15A, for example, two narrow, long intermediate banks 15e are juxtaposed between both side edge barks 15d, forming three grooves 23A, for example, between the edge banks 15d and intermediate banks 15e. The number of the grooves and barks can be changed optionally. The two bottom corners of each groove 23A are rounded to a generous radius 14A, respectively. Each groove 23A is open at the side face 15c.

In the separator 16A, for example, two narrow, long intermediate banks 16e are juxtaposed between both side edge banks 16d, for example, forming three grooves 24A between the banks 16d and 16e. The two bottom corners of each groove 24A are rounded to a generous radius 14B, respectively. Each groove 24A is open at the side face 16c. A pair of grooves 23A and 24A facing each other forms an oxidant gas flow passage 22A. The boundary surface 13A between the edge banks 15d and 16d and the boundary surface 13B between the intermediate banks 15e and 16e are connected with the oxidant gas flow passage 22A at its flat surfaces parallel with the side faces 15b and 16b, respectively, and not at its each corner portion. The side face 15b of the cathode 15A is contiguous to the side face 16b of the separator 16A without difference in level.

A dense solid electrolyte membrane 19 has its main portion 19a formed on the top face 15a of the cathode 15A. Both extended portions 19b cover the side faces 15b of the cathode 15A and further the upper portions of the side faces 16b of the separator 16. An anode membrane 20 is formed on the solid electrolyte membrane 19.

Figure 3B:
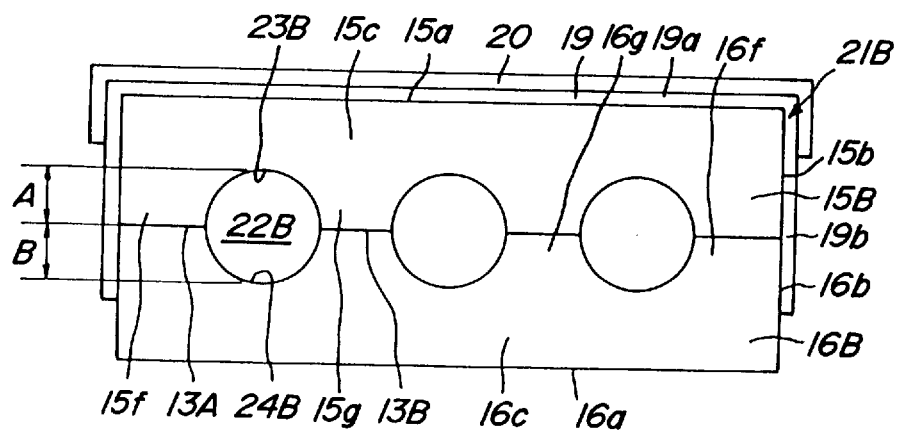
FIG. 3b is a front view showing an electrochemical cell fabricated by forming a solid electrolyte membrane 19 and an anode membrane 20 on a layered sintered body 21B.

FIG. 3a is a front view showing another layered body 9B for a layered sintered body and FIG. 3b is a front view showing an electrochemical cell fabricated by forming a solid electrolyte membrane and an anode membrane on a layered sintered body 21B. In the layered body 9B, the green shaped body 10B for the cathode and the green shaped body 11B for the separator are firmly contacted with each other. The green shaped bodies 10B and 11B are rectangular in their plan view and has grooves 17B, 18B extending along the longitudinal axis thereof. The grooves 17B and 18B have a semi-circular cross-sectional shape. The grooves 17B and 18B facing each other are coupled to form an oxidant gas flow passage 12B having a quite round cross-sectional shape. 13A and 13B are the boundary surfaces of the layered body.

A layered sintered body 21B as shown in FIG. 3b can be manufactured by firing this layered body 9B. In FIG. 3b, the same parts as those shown in FIG. 2b are indicated by the same denotations and explanations are omitted. Here, a pair of grooves 23B and 24B facing each other forms an oxidant gas flow passage 22B. Each groove has a semi-circular cross-section. In other words, the inside wall of the edge bank 15f and both the side walls of the intermediate bank 15g of the electrode 21B, and the inside wall of the edge bank 16f and both the side walls of the intermediate bank 16g of the separator 16B, are all shaped in the same rounded surface. Thus, a pair of grooves 23B and 24B facing each other forms an oxidant gas flow passage 22B having a quite round cross-sectional shape.

The extrusion-shaping also can be conducted with an extrusion die as shown in FIG. 4. In the inside is spaces 4A and 4B of the cylinder 5A and 5B, respectively, are charged with pug for an electrode or pug for a separator. The rod 25A of the plunger 1A is thrusted towards the die 27 to extrude the pug for the electrode 26A through the die 27. Simultaneously therewith, the rod 25B of the plunger 1B is thrusted towards the die 27 to extrude the pug for the separator 26B through the die 27. The extrusion die 27 comprises an inlet block 27a and an outlet block 27b. In the inlet block 27a, are formed two approaches 28A and 28B, which are separated by a partition wall 27c. Each approach has a circular cross-sectional shape. The outlet channel 27d in the outlet block 27 has a rectangular cross-sectional shape.

By extrusion-shaping of both the pug 26A and pug 26B, for example, a planar-shaped layered body is manufactured. In this instance, the layered body can be formed in such a shape as shown in FIG. 2a or 3a. Alternatively, the shape car, be changed optionally by changing the shape of the cavity-forming member 8. In this embodiment, each extrusion rate or pressure of the first plunger 1A and the second plunger 1B is controlled so that the layered bodies may not bend during extrusion.

Figure 5A:
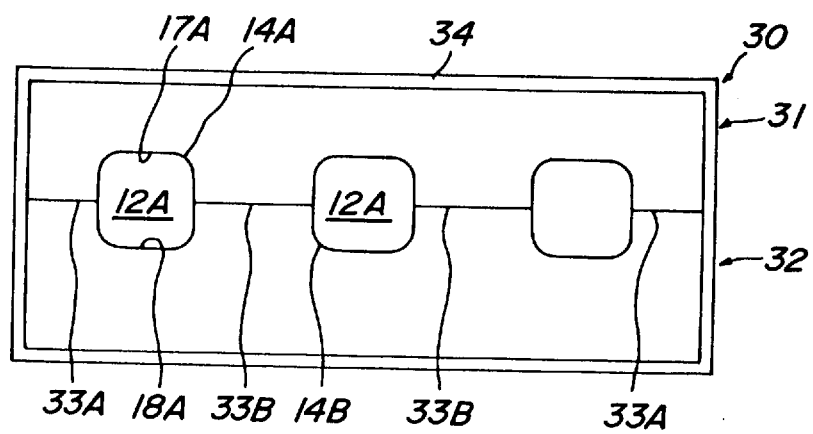
FIG. 5a is a front view showing a layered body 30 comprising a green shaped body 31 for an electrode and green shaped body 32 for a separator.
Figure 5B:
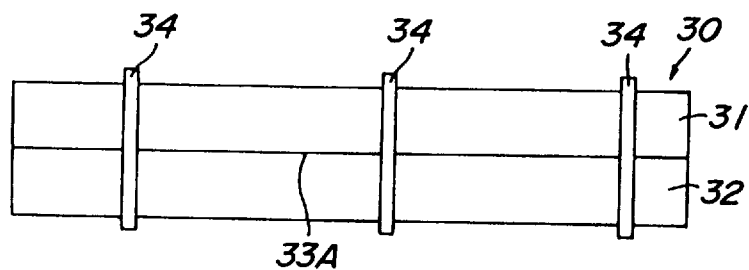
FIG. 5b is a side elevational view showing the layered body 30.

FIG. 5a is a front view showing a layered body 30 after drying which is manufactured according to another embodiment of the present invention. FIG. 5b is a side elevation of the layered body shown in FIG. 5a. In the layered body 30, the green shaped body 31 for the cathode and the green shaped body 32 for the separator are firmly contacted with each other. The green shaped bodies 31 and 32 are severally shaped by an extrusion-shaping process and preferably pre-dried.

Then, the banks of one green shaped body are made to face the banks of the other green shaped body, respectively, with the interposition of a bond material layer therebetween, and conjoined with each other. The green shaped body 31 is, for example, rectangular in its plan view, and a groove 17A is formed extending along the longitudinal axis thereof. The green shaped body 32 has a shape substantially the same as the green shaped body 31, and a groove 18A is formed extending along the longitudinal axis of the rectangle. Two bottom corners of the groove 17A are rounded to a generous radius 14A, and two bottom corners of the groove 18A are rounded to a generous radius 14B, respectively.

Here, 33A and 33B are joint boundary surfaces of the green shaped bodies 31 and 32. On these joint boundary surfaces, is preferably formed a bond material layer (not shown). Then, the layered body is bound up across its long side with a predetermined number (three in this embodiment) of annular elastic bodies (e.g., rubber band) 34. These elastic bodies 34 are contacted with the top face and both side faces of the green shaped body 31 and both side faces and the bottom face of the green shaped body 32, whereby whole of the layered body 30 is elastically squeezed. In this state, the layered body 30 is sufficiently dried. The drying can be conducted by heating the layered body at a temperature of not exceeding 100° C. and/or blasting.

Then, this layered body 30 is immersed in an elastic material such as a liquid latex or the like, to adhere the elastic material to the layered body and then dried. Thereby, as shown in FIG. 6a, an elastic coating film 35A is formed on the entire exterior surface of the layered body 30, and an elastic coating film 35B is formed on the interior surface of the through-hole 12A. Then, this layered body is press-shaped according to a cold isostatic press to manufacture a press-shaped body. A conjoint body 36 as shown in FIG. 6b is manufactured by firing this press-shaped body. The firing temperature is appropriately selected according to the kind of the ceramic materials.

In the cathode 37 of the conjoint body 36, for example, two narrow, long intermediate banks 37e are formed between the edge banks 37d. Between the edge banks 37d and intermediate banks 37e, are formed, for example, three parallel grooves 23A. Two bottom corners of each groove 23A are rounded to a generous radius 14A, respectively. Each groove 23A is open at the side face 37c.

In the separator 38 of the conjoint body 36, for example, two narrow, long intermediate banks 38e are formed between the edge banks 38d. Between the edge banks 38d and intermediate banks 38e, are formed, for example, three parallel grooves 24A. Two bottom corners of each groove 24A are rounded to a generous radius 14B, respectively. Each groove 24A is open at the side face 38c of the separator 38. A pair of grooves 23A and 24A facing each other forms an oxidant gas flow passage 22A, The boundary surface 33A between the edge banks 37d and 38d and the boundary surface 33B between the intermediate banks 37e and 38e are connected with the oxidant gas flow passage 22A at its flat surfaces parallel with the side faces 37b and 38b, respectively, and not at its each corner portion. The side face 37b of the cathode 37 is contiguous to the side face 38b of the separator 38 without difference in level.

A dense solid electrolyte membrane 19 has its main portion 19a formed on the top face 37a of the cathode 37. Both extended portions 19b cover the side faces 37b of the cathode 37 and further the upper portions of the side faces 38b of the separator 38. An anode membrane 20 is formed on the solid electrolyte membrane 19.

DESCRIPTION OF THE PREFERRED EMBODIMENTS

Further concrete experimental results will be described by way of example hereinafter.

(EXAMPLE 1)

100 parts by weight of lanthanum strontium manganite powder were admixed with 3 parts by weight of methyl cellulose and 3 parts by weight of cellulose. To this mixed powder, 14 parts by weight of water were added and kneaded with a kneader. The resultant kneaded product was put into a vacuum pug mill and a round columnar pug shaped body of 50 mm diameter and 300 mm length for an air electrode was produced.

On the other hand, 100 part by weight of lanthanum chromite powder were admixed with 2.5 parts by weight of methyl cellulose and 14 parts by weight of water, and a kneaded product was obtained by using a kneader. The resultant kneaded product was put into a vacuum pug mill and a round columnar pug shaped body of 50 mm diameter and 300 mm. length for a separator was produced. When shaping, the shape of the extrusion die was regulated so that every bottom corner of each groove of the shaped body might be rounded to a generous radius.

With an extrusion-shaping apparatus as shown in FIG. 4, the layered body 9A shown in FIG. 2a was manufactured according to the aforementioned process. The extrusion rates of both pug shaped bodies were substantially equalized. This layered body 9A was put in a thermohygrostatic dryer and dried at 80° C. After drying, the dried layered body was put in an electric furnace, wherein the temperature was increased up to 1,550° C. at a temperature increasing rate of 40° C./hr. and kept at 1,550° C. for 4 hours to conduct monolithical sintering and the sintered body 21A shown in FIG. 2b was produced. This sintered body had dimensions of 7 mm thickness, 21 mm width and 50 mm length. The oxidant gas flow passages had a cross-section 3 mm high and 3 mm wide. However, both A and B as shown in FIG. 2b were 1.5 mm.

With respect to this layered sintered body, a heat cycle test was conducted. Namely, the temperature of the layered sintered body was increased from room temperature up to 1,200° C. at a temperature increasing rate of 200° C./hr., kept at 1,200° C. for 30 minutes, decreased from 1,200° C. down to 100° C. at a temperature decreasing rate of 200°

C./hr. and kept at 100° C. for 30 minutes. The above temperature rise and fall cycle between 1,200° C. and 100° C. was repeated and finally the layered sintered body was cooled down to room temperature and examined for crack formation. Ten pieces in total of samples were tested. As the result, even after 20 heat cycles, no crack formation was observed.

On this layered sintered body, a solid electrolyte membrane and a fuel electrode membrane were formed according to the following process and an electrochemical cell as shown in FIG. 2b was manufactured. An yttria-stabilized zirconia membrane 100 μm thick was formed by flame spraying on the air electrode side of the layered sintered body. Then, this flame-sprayed zirconia membrane was densified by heat-treating at 1,400° C. for 3 hours. On the thus obtained solid electrolyte membrane, nickel oxide/zirconia mixed powder pasted with polyethylene glycol was screen-printed and fired at 1,400° C. for an hour to produce a fuel electrode membrane. When this fuel electrode membrane is exposed to hydrogen during power generation, the nickel oxide is reduced and a nickel-zirconia cermet is produced. Besides, on the surface of the interconnector opposite to the fuel electrode, a nickel membrane 7 μm thick was formed by electroless plating.

Using the thus fabricated electrochemical cell, an experiment of power generation was conducted. The electrochemical cell was held by a ceramic manifold, and a nickel mesh was used as a current collector. For the gas sealing portion between the manifold and electrochemical cell, a Pyrex™ glass was used. This Pyrex™ glass is melted under power generation conditions at 1,000° C. and displays a gas-sealing function. As a fuel gas, hydrogen gas moistened by bubbling at room temperature was used, and as an oxidant gas, air was used. The air was fed to the air electrode side through the manifold and each oxidant gas flow passage of the electrochemical cell. The hydrogen gas was fed to the fuel electrode side by flowing on the circumference of the electrochemical cell.

Under these power generation conditions, the internal resistance of the electrochemical cell was determined according to a complex impedance method. The generating current was made to be 300 mA in per unit area of the fuel electrode. Each internal resistance at initial stage of power generation and after continuous generation for 100 hours was measured. Change of the internal resistance and whether cracks were formed or not on the electrochemical cell were observed. As the result, even after the continuous generation for 100 hours, neither layer separation nor crack was observed. Additionally, the initial internal resistance was 0.28 $\Omega \cdot cm^2$ and that after continuous generation for 100 hours was 0.31 $\Omega \cdot cm^2$.

(EXAMPLE 2)

In the same manner as that of Example 1, a layered sintered body was manufactured. However, the pressure of the each extrusion plunger was adjusted so that the grooves of the electrode might have a depth (A) of 0.5 mm and the grooves of the separator might have a depth (B) or 2.5 mm. As the result, after a 20 times heat cycle test, neither layer separation nor crack was observed. Further, even after the continuous generation for 100 hours, also neither layer separation nor crack was observed. Additionally, the initial internal resistance was 0.30 $\Omega \cdot cm^2$ and that after continuous generation for 100 hours was 0.33 $\Omega \cdot cm^2$.

(EXAMPLE 3)

In the same manner as that of Example 1, a layered sintered body was manufactured. However, the pressure of the each extrusion plunger was adjusted so that the grooves of the electrode might have a depth (A) of 0.3 mm and the grooves of the separator might have a depth (B) of 2.7 mm. As the result, with respect of one sample, layer separation initiating from near the boundary of the layers was observed after a 20 times heat cycle test. Further, even after a continuous generation for 100 hours, neither layer separation nor crack was observed. Additionally, the initial internal resistance was 0.30 $\Omega \cdot cm^2$ and that after continuous generation for 100 hours was 0.40 $\Omega \cdot cm^2$.

(EXAMPLE 4)

In the same manner as that of Example 1, a layered sintered body was manufactured. However, the pressure of the each extrusion plunger was adjusted so that the grooves of the electrode might have a depth (A) of 2.0 mm and the grooves or the separator might have a depth (B) of 1.0 mm. As the result, after a 20 times heat cycle test, neither layer separation nor crack was observed. Further, even after the continuous generation for 100 hours, also neither layer separation nor crack was observed. Additionally, the initial internal resistance was 0.27 $\Omega \cdot cm^2$ and that after continuous generation for 100 hours was 0.30 $\Omega \cdot cm^2$.

(EXAMPLE 5)

In the same manner as that of Example 1, a layered sintered body was manufactured. However, the pressure of the each extrusion plunger was adjusted so that the grooves of the electrode might have a depth (A) of 2.5 mm and the grooves of the separator might have a depth (B) of 0.5 mm. As the result, after a 20 times heat cycle test, neither layer separation nor crack was observed. Further, even after the continuous generation for 100 hours, also neither layer separation nor crack was observed. Additionally, the initial internal resistance was 0.26 $\Omega \cdot cm^2$ and that after continuous generation for 100 hours was 0.29 $\Omega \cdot cm^2$.

(EXAMPLE 6)

In the same manner as that of Example 1, a layered sintered body was manufactured. However, the pressure of the each extrusion plunger was adjusted so that the grooves of the electrode might have a depth (A) of 2.7 mm and the grooves of the separator might have a depth (B) of 0.3 mm. As the result, with respect of one sample, layer separation initiating from near the boundary of the layers was observed after a 20 times heat cycle test. Further, even after a continuous generation for 100 hours, neither layer separation nor crack was observed. Additionally, the initial internal resistance was 0.26 $\Omega \cdot cm^2$ and that after continuous generation for 100 hours was 0.36 $\Omega \cdot cm^2$.

(Comparative Example 1)

In the same manner as that of Example 1, a layered sintered body was manufactured. However, the pressure if the each extrusion plunger was adjusted so that the grooves of the electrode might have a depth (A) of 3.0 mm. and the grooves of the separator might have a depth (B) of 0.0 mm namely, the separator right be a simple plate. As the result, with respect of 8 samples among 10 samples, layer separation initiating from near the boundary of the layers was observed after a 20 times heat cycle test. Further, after a continuous generation for 100 hours, layer separation from near the boundary of the layers was observed. Additionally, the initial internal resistance was 0.25 $\Omega \cdot cm^2$ and that after continuous generation for 100 hours was 1.00 $\Omega \cdot cm^2$.

(Comparative Example 2)

In the same manner as that of Example 1, a layered sintered body was manufactured. However, the pressure of the each extrusion plunger was adjusted so that the grooves of the electrode might have a depth (A) of 0.0 mm and the grooves of the separator might have a depth (B) of 3.0 mm, namely, the electrode might be a simple plate. As the result, with respect of 9 samples among 10 samples, layer separation initiating from near the boundary of the layers was observed after a 20 times heat cycle test. Further, after a continuous generation for 100 hours, layer separation from near the boundary of the layers was observed. Additionally, the initial internal resistance was 0.31 $\Omega \cdot cm^2$ and that after continuous generation for 100 hours was 1.41 $\Omega \cdot cm^2$.

(EXAMPLE 7)

In the same manner as that of Example 1, a layered sintered body was manufactured. However, the layered sintered body had a shape as shown in FIG. 3b. Each oxidant gas flow passage 22B was made to have a diameter of 3.0 mm. The pressure of the each extrusion plunger was adjusted so that the grooves of the electrode might have a depth (A) of 1.5 mm and the grooves of the separator might have a depth (B) of 1.5 mm. As the result, after a 20 times heat cycle test, neither layer separation nor crack was observed. Further, even after the continuous generation for 100 hours, also neither layer separation nor crack was observed. Additionally, the initial internal resistance was 0.27 $\Omega \cdot cm^2$ and that after continuous generation for 100 hours was 0.28 $\Omega \cdot cm^2$.

(EXAMPLE 8)

Pug for air electrode and pug for separator were produced in the same manner as that of Example 1. Then, an electrochemical cell was fabricated according to the process explained with reference to FIGS. 5 and 6. However, each shaped body was made to have dimensions of 10 mm thickness, 40 mm width and 100 mm length. These shaped bodies were stacked with interposition therebetween of a paste comprising 50 parts by weight of lanthanum chromite powder, 50 parts by weight of lanthanum manganite powder and some water, dried at 100° C., applied on the surface with a liquid rubber latex and subjected to a hot isostatic press at a load of 50 kg/cm². This sintered body was machine finished to provide a layered sintered body having dimensions of 9 mm thickness, 27 mm width and 50 mm length. The oxidant gas flow passages had a cross-section 3.0 mm high and 5 mm wide. However, the grooves of the air electrode had a depth (A) of 1.5 mm, and the grooves of the separator also had a depth (B) of 1.5 mm.

As the result, after a 20 times heat cycle test, neither layer separation nor crack was observed. Further, even after the continuous generation for 100 hours, also neither layer-separation nor crack was observed. Additionally, the initial internal resistance was 0.30 $\Omega \cdot cm^2$ and that after continuous generation for 100 hours was 0.33 $\Omega \cdot cm^2$.

(EXAMPLE 9)

In the same manner as that of Example 8, a layered sintered body was manufactured. However, the cross-section of the oxidant gas flow passages was made to have dimensions of 5.0 mm height and 5.0 mm width, and both the depths (A) and (B) were made to be 2.5 mm. As the result, after a 20 times heat cycle test, neither layer separation nor crack was observed. Further, even after the continuous generation for 100 hours, also neither layer separation nor crack was observed. Additionally, the initial internal resistance was 0.31 $\Omega \cdot cm^2$ and that after continuous generation for 100 hours was 0.34 $\Omega \cdot cm^2$.

(EXAMPLE 10)

In the same manner as that of Example 1, a layered sintered body comprising a cathode of lanthanum manganite and a separator of lanthanum chromite was manufactured. On this layered sintered body, a solid electrolyte membrane and anode membrane were formed according to the following process to provide a water vapor electrolytic cell as shown in FIG. 2b.

With a plasma spraying apparatus, a membrane 60 μm thick of a 8 mol.% yttria-stabilized zirconia was formed by plasma spray coating on the cathode side of the layered sintered body. Then, this spray coated membrane together with the layered sintered body was heat-treated at 1,400° C. for 4 hours in an electric furnace, whereby the spray coated membrane was densified to provide a solid electrolyte membrane.

On the other hand, a commercially available platinum paste was admixed with a finely powdered 8 mol. % yttria-stabilized zirconia having an average particle diameter of 1 μm in a proportion of platinum to zirconia of 9:1. The viscosity of the resulting paste was regulated by adding polyethylene glycol to the mixed powder. With this paste, a membrane of 8 cm² in area was formed on the solid electrolyte membrane by means of screen printing process. The resultant was fired at 1,300° C. for 4 hours in an electric furnace to provide an anode membrane. Thus, the cell of this example was obtained.

With this cell, water vapor electrolysis was conducted at 1,000° C. in an electric furnace. To the anode (platinum-zirconia cermet) side, 10% $H_2O$ was fed with a helium carrier gas containing 4% hydrogen. To the cathode side, air was fed. In this instance, the end portion of the cell was sealed with glass from the gas supplying-manifold, so that the gas on the anode side and the cathode side might not be mixed with each other. For the assessment of water vapor electrolytic characteristics, the current density was determined. The results are shown in Table 1.

TABLE 1

| Voltage (mV) | Current Density (mA/cm²) |
| --- | --- |
| 800 | 0 |
| 900 | 51 |
| 1000 | 92 |
| 1100 | 130 |
| 1200 | 175 |
| 1300 | 215 |
| 1500 | 255 |

As shown in Table 1, when the voltage is 1.5V a current density of at least 250 mA/cm² was obtained. Additionally, in this instance, the quantity of hydrogen generated was determined according to gas chromatography. As the result, the quantity of hydrogen generated was about 14 cc/min. Thus, it has been found that hydrogen can be generated by water vapor electrolysis.

After the current density-voltage performance had been thus determined, the cell was once cooled down to room temperature at a temperature decreasing rate of 300° C./min. and then heated again up to 1,000° C. at a temperature increasing rate of 300° C./min. The cell was subjected to the 20 times repetition of this cooling-heating cycle. Then, the current density-voltage performance was determined under conditions the same as the above. As the result, the determined current density-voltage performance was substantially the same as that before the cooling-heating cycle. In addition, the cell was taken out after the test and observed. Then, neither layer-separation nor crack was found on the cell.

(Comparative Example 3)

A water vapor electrolytic cell was manufactured in the same manner as that of Comparative Example 1. With respect of this cell, the current density-voltage performance was determined in the same manner as Example 10. The result is shown in Table 2. Further with respect of this cell, the cooling-heating cycle was repeated 20 times and then the current density-voltage performance was determined. The result is also shown in Table 2.

TABLE 2

|  | Current Density (mA/cm$^2$) | |
| --- | --- | --- |
| Voltage (mV) | Initial | After 20 times cooling-heating cycles |
| 800 | 0 | 0 |
| 900 | 48 | 35 |
| 1000 | 90 | 61 |
| 1100 | 125 | 81 |
| 1200 | 176 | 100 |
| 1300 | 212 | 120 |
| 1500 | 251 | 133 |

As is understood from the results, the initial current density-voltage performance was comparable to that of Example 10. However, after conducting the cooling-heating cycle 20 times, the current density was extremely lowered.

Furthermore, after conducting the cooling-heating cycle 20 times, the cell was taken out from the electric furnace and observed. As the result, on the boundary surface between the cathode and separator, layer separation was partly observed. It is conjectured that since the adhesiveness at the boundary surface between the cathode and separator is low, a local layer separation is caused by the application of the cooling-heating cycle, with the consequence that the internal electric resistance of the cell is increased and the electrolytic performance is lowered.

As described hereinabove, according to the present invention, even when an electro-chemical cell is subjected to the repetition of a heating-cooling cycle of high temperature, for example, at 1,000° C. down to room temperature, an increase of the internal resistance on and around the joint surface between the separator and electrode can be restrained and the layer separation at the joint surface can be prevented. Furthermore, possibilities of development of cracks in the surroundings of the joint surface between the electrode and separator can be obviated.

We claim:

1. A planar-type layered sintered body for electrochemical cells, having an electrode and a separator adjoining each other and having a plurality of gas flow passages disposed therebetween, comprising: a plurality of grooves provided on said electrode on a side thereof adjoining said separator, and a plurality of grooves provided on said separator on a side thereof adjoining said electrode, wherein each of said gas flow passages comprises a pair of grooves comprising one of said grooves provided on said electrode with the one opposite thereto of the grooves provided on said separator.

2. The layered sintered body according to claim 1, wherein said gas flow passages have a polygonal cross-sectional shape and each corner of said polygonal cross-section is rounded.

3. The layered sintered body according to claim 1, wherein said as flow passages have a cross-sectional shape defined by a closed, rounded outline.

4. The layered sintered body according to claim 1, wherein both said grooves provided on said electrode and said separator have a depth of 0.5–10 mm.

5. The layered sintered body according to claim 1, further comprising a solid electrolyte membrane provided on said electrode and another electrode membrane provided on said solid electrolyte membrane, and wherein gas in each gas flow passage is hermetically sealed off from external gases by said separator and said solid electrolyte membrane.

* * * * *